United States Patent [19]

Steinhoff

[11] Patent Number: 4,964,326
[45] Date of Patent: Oct. 23, 1990

[54] MACHINE TOOL

[75] Inventor: Karl Steinhoff, Elspe, Fed. Rep. of Germany

[73] Assignee: Muhr und Bender, Maschinenbau GmbH, Attendorn, Fed. Rep. of Germany

[21] Appl. No.: 424,041

[22] Filed: Oct. 19, 1989

[30] Foreign Application Priority Data

Nov. 8, 1988 [DE] Fed. Rep. of Germany ....... 3838197

[51] Int. Cl.$^5$ .......................... B26D 7/00; B30B 15/00
[52] U.S. Cl. ...................................... 838/559; 72/481; 100/231
[58] Field of Search ................... 29/560, 560.1, 564, 29/33 R; 83/527, 552, 559, 560, 682; 72/387, 389, 404, 442, 448, 455, 469, 470, 472, 481, 482; 100/224, 214, 231, 227 R, 257

[56] References Cited

U.S. PATENT DOCUMENTS

| 3,942,431 | 3/1976 | Goff | 72/470 |
| 3,958,482 | 5/1976 | Claesson | 83/559 |
| 4,587,830 | 5/1986 | Mills | 72/442 |
| 4,661,484 | 9/1986 | Kissinger et al. | 72/481 |
| 4,674,373 | 6/1987 | Kuppinger | 83/561 X |
| 4,703,678 | 11/1987 | Kiuchi | 83/559 |
| 4,771,669 | 9/1988 | Bianchi | 83/559 X |

FOREIGN PATENT DOCUMENTS

| 1004891 | 4/1953 | Fed. Rep. of Germany . | |
| 47-35508 | 9/1972 | Japan | 83/559 |
| 848192 | 7/1981 | U.S.S.R. | 83/562 |
| 1604825 | 12/1981 | United Kingdom | 72/481 |

Primary Examiner—William Briggs
Attorney, Agent, or Firm—Browdy and Neimark

[57] ABSTRACT

A machine tool with a machine frame open at three sides, in the shape of the letter C, having upper and lower die supports disposed on the machine frame, a drive cradle disposed on the upper die support, a saddle plate disposed on the lower die support and a tool unit comprised or an upper die and a lower die in a guide frame. The machine tool has in particular a cutting unit or a coping unit, with T-groove coupling means being provided on the upper and lower die supports for connection with tool unit; wherein said tool unit as a whole is insertable between the upper and the lower die supports in the longitudinal direction of the machine frame from the direction of the open front end. In operations the tool unit is highly flexible because the saddle plate is rotatable in the horizontal plane with respect to the lower die support.

8 Claims, 2 Drawing Sheets

MACHINE TOOL

FIELD OF THE INVENTION

The invention pertains to a machine tool with a machine frame open at three sides, preferably in the approximate shape of the letter C, having upper and a lower die supports disposed on the machine frame, a drive cradle disposed on the upper die support, a saddle plate disposed on the lower die support, and a tool unit comprised of an upper die and a lower die in a guide frame, in particular a cutting unit or a coping unit, wherein coupling means are provided on the upper and lower die supports for connection with the tool unit; the tool unit as a whole being engagingly insertable between the upper and the lower die supports longitudinal direction of the machine frame, i.e. from the direction of the open front end.

BACKGROUND OF THE INVENTION

A machine tool having a coping unit as a tool unit is known (German Published, Examined Patent Application No. DE-AS 10 04 891).

The upper die is guided vertically slidable in guide rails in a guide frame. The upper die has at the upper end T-shaped or hammerhead-like coupling means insertable into corresponding coupling means, here in the shape of a T-groove, on the upper die support. In a corresponding manner the guide frame of the tool unit receiving the lower die has at its lower end an inverted T-shaped plate as coupling means, into which coupling means on the lower die support, also in the shape of a T-groove, can be inserted. Thus, the entire tool unit is engagingly inserted in the longitudinal direction of the machine frame, from the direction of the open front end, between the upper and the lower die support.

The known machine tool described above is practical in that it permits quick and simple exchange of the tool unit, it being possible at the same time, because of the self-guidance of the dies in the tool unit, to compensate for or to absorb within the tool unit the lateral forces occurring in particular during cutting or coping, etc.

However, the known machine tool is not sufficiently flexible because, for example, a succession of bevel cuts at different bevel angles for successive cuts requires an exchange of the tool unit for another having the next required bevel angle.

SUMMARY OF THE INVENTION

It is therefore an object of the present invention to design and improve the known machine tool in such a way that it is more flexible and will necessitate an exchange of the tool unit when a succession of bevel cuts at different bevel angles for successive cuts are required.

The object is attained by disposing the saddle plate to be rotatable in the horizontal plane with respect to the lower die support.

Through the invention, it has been realized that use of a self-guide tool unit makes it possible to simply set any desired bevel angle by turning the saddle plate in respect to the lower die support, when a cutting unit is used as the tool unit, and this is of course considerably less complicated than exchanging the tool unit itself. This technique, which avoids exchange of the tool unit is also much more effective in regard to costs, because it is not necessary to stock tool units for different bevel angles, and corresponding advantages in handling also ensue with other types of tool units having axially non-symmetrical tools.

There are many possibilities for designing the machine tool of the invention, however, reference is made to the drawings and description for a preferred but non-limiting embodiment.

DETAILED DESCRIPTION OF THE INVENTION

Figure 1:
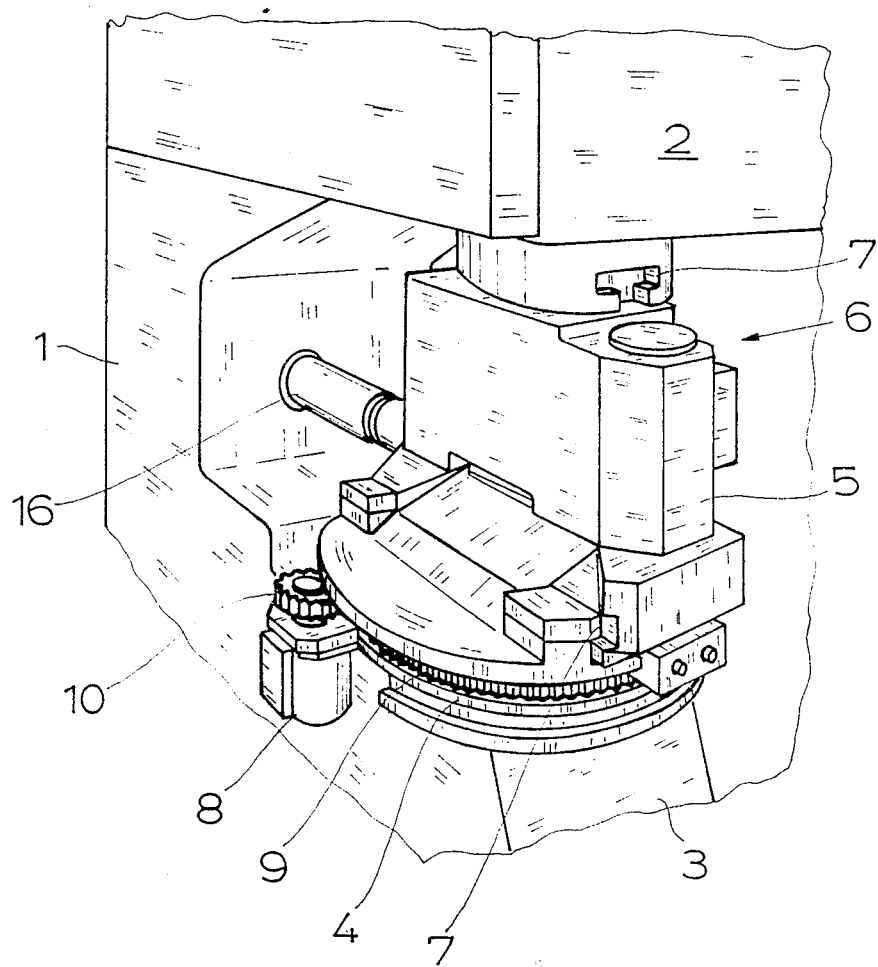
FIG. 1 is a partial, perspective view of the machine tool in accordance with the invention.

In general, the machine tool of FIG. 1, has a machine frame 1, open on three sides and preferably having the approximate shape of a letter C. Disposed on the machine frame 1 is an upper die support 2 and a lower tool support 3. A drive cradle (not shown) is disposed on the upper die support 2 in a manner known per se, and a saddle plate 4 is fixed on the lower die support 3. A tool unit 6, comprising an upper die and a lower die in a guide frame 5 is disposed on saddle plate 4. Thus, the tools in the tool unit 6 are self-guided in guide frame 5, such as is known per se, from the state of the art as detailed above.

Coupling means 7, in the shape of T-grooves, are visible on the upper and lower die supports 2, 3. While T-grooves shaped coupling means are preferred, different types of coupling means will suffice in the context of the invention. Coupling means 7, are used for connecting die supports 2, 3, with tool unit 6, and in this manner can be engagingly inserted as a unit between the upper and the lower die support 2, 3. Insertion of the coupling means is accomplished in the embodiment shown, as in the state of the art, in that the corresponding hammerheads or T-heads of the tool unit 6 are pushed in the longitudinal direction of the machine frame 1, i.e. from the direction of the open front end of the machine frame 1, into the coupling means 7, which are in the shape of T-grooves.

It is initially of essential importance in accordance with the invention, that the saddle plate 4 be rotatable in the horizontal plane with respect to the lower die carrier. From FIG. 1, it can be that the dies in tool unit 6 can be put at optional angles in respect to, for example, a work piece placed crosswise in relation to machine frame 1, by turning the saddle plate 4 in the horizontal plane with respect to the lower die carrier 2.

The turning movement of the saddle plate 4 may be limited in one or both rotational directions by the use of stops (not shown). Also, intermediate positions for frequently occurring rotational angles, for example frequently selected bevel angles, may also be provided by locking means (not shown). In FIG. 1, there is shown a motor drive, in particular, a rotary drive 8 in the form of a hydraulic motor, disposed in the saddle plate 4. A hydraulic motor as a rotary drive means 8 is particularly practical, because a hydraulic medium is applicable in many places for driving machine tools.

How the rotary drive 8 should be drivingly connected to the saddle plate 4 is a matter of choice that is easily attainable for those skilled in the art. However, it has been found that rotary drive 8, is particularly practical, because of its small inclination to break down under rough operational conditions. In the configuration of the invention, the design of rotary drive 8 is characterized in that the saddle plate 4 has a toothed wheel rim 9 extending around its circumference and the rotary drive 8 has a pinion gear 10 which engages or is engageable with the toothed wheel rim 9. If, by means of stops, the total rotational movement of the saddle plate 4 is limited to a preselected angle of less than 360° the toothed wheel rim 9 on the outer circumference of the saddle plate 4 only needs to extend over the area of the angle actually needed for rotation.

Figure 2:
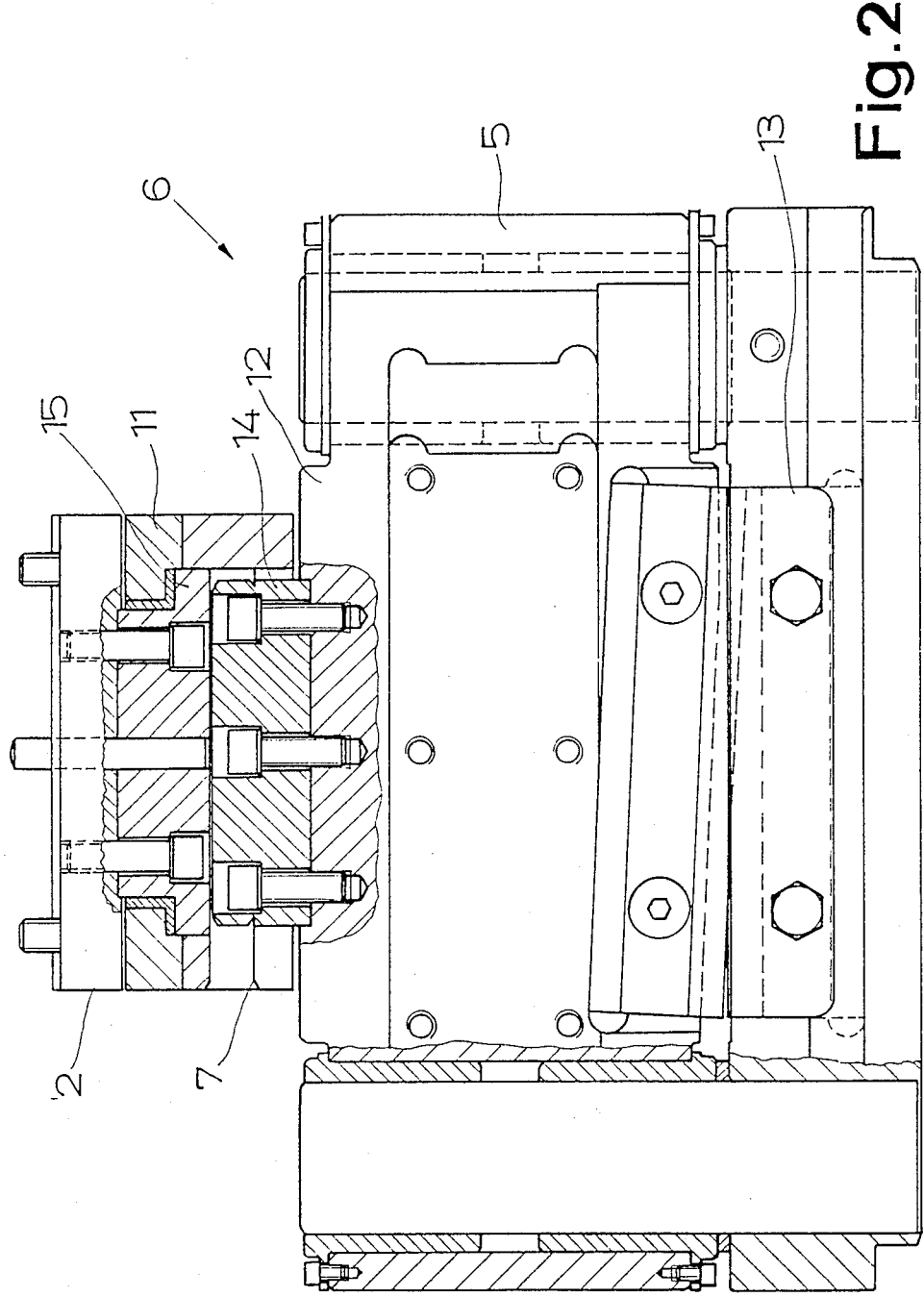
FIG. 2 is an enlarged, partial vertical section of a particularly preferred tool unit for a machine tool in accordance with FIG. 1.

Because of the rotation of the tool unit 6 together with the saddle plate 4, the connection between the tool unit 6 and the upper die support 2 must also permit rotational movement. This can be accomplished by positioning the coupling means such that they are symmetrically rotatable on the upper die support, i.e. the tool unit being axially coupled with the upper die support, but being freely rotatable in respect to the upper die support. In the preferred embodiment shown, this is accomplished by the upper die support 2 having a rotatable support element 11 supporting the coupling means 7, which is rotatable with respect to the drive cradle. This is particularly clearly in FIG. 2, where the upper die 12 and the lower die 13 are illustrated. Coupling means 14 in the form of a T-head are screwed to the upper die 12, which is slideable in the coupling means 7 in the form of a T-groove of upper die support 2. In FIG. 2 the open front end of the machine frame 1 is on the left and the closed end of the machine frame 1 to the right.

On the upper die support 2, the support element 11 is located on a hammerhead-shaped axial support 15 and extends over the axial support 15 in the shape of a letter U. In this manner, the entire tool unit 6 together with the support element 11 can be rotated with respect to the upper die support 2 while maintaining the connection for the transfer of force from the drive cradle, (not shown), in the upper die support 2.

An equivalent or alternate design would be to provide a correspondingly rotatable connecting element on the tool unit, i.e. to support the coupling means 14 rotatingly, for example, with respect to the tool unit 6.

In order to avoid the necessity of having to either pull the tool unit 6, which may have considerable weight at times, by hand in a forward direction out of the saddle plate 4 or to push it into the saddle plate 4, it is recommended to provide a thrust drive 16 on the lower die support 3 operating in the longitudinal direction of the machine frame 1, by means of which the tool unit 6 can be pushed out of the saddle plate 4 in the direction towards the front, and, if desired, pulled into the saddle plate 4 in the opposite direction. In the embodiment shown in FIG. 1, the thrust drive 16 is in the form of a hydraulic drive. The thrust drive 16 is disposed between the saddle plate 4 and the machine frame 1 in the embodiment shown and is only connected with the tool unit 6 in the central normal position of the saddle plate 4. However, if the saddle plate 4 and the tool unit 6 are turned in the horizontal plane, the thrust drive 16 cannot move the tool unit 6, and this is a practical design feature.

It is also possible to fix the thrust drive on the saddle plate itself, i.e. to let the thrust drive act between a thrust bearing provided on the saddle plate and the tool unit. In this way, the thrust drive could push the tool unit out of the saddle plate or pull it into the saddle plate in every rotated position of the saddle plate.

For safety reasons, it is recommended that the upper die be positively lowered onto the lower die prior to pushing the tool unit 6 out of the saddle plate 4.

FIG. 2 illustrates that, in accordance with a preferred teaching of the invention, the tool unit 6 has a guide frame 5 in the form of a columnar guide. Guide frames in the form of columnar guides for tool units of the type under discussion are, of course, known per se, and in this connection, reference is made to the journal, "Blech, Rohre, Profile" [Sheet Metal, Conduits, Sections] 31 (1984), pp. 166, 167.

What is claimed is:

1. A machine tool comprising a machine frame open at three sides and being in the approximate shape of the letter C, having upper and lower die supports disposed on said machine frame, a drive cradle disposed on the upper die support, a saddle plate disposed on the lower die support, and a tool unit, comprised of an upper die and a lower die in a guide frame, coupling means provided on the upper die support and on the saddle plate disposed on the lower die support for connection with said tool unit, wherein said tool unit as a whole is insertable between the upper and the lower die support in the longitudinal direction of said machine frame, from the direction of the open front end, wherein said saddle plate is rotatably disposed in the horizontal plane with respect to the lower die support, and wherein the upper tool support has a support element supporting the coupling means and is rotatable with respect to a drive cradle.

2. A machine tool comprising a machine frame open at three sides and being in the approximate shape of the letter C, having upper and lower die supports disposed on said machine frame, a drive cradle disposed on the upper die support, a saddle plate disposed on the lower die support, and a tool unit, comprised of an upper die and a lower die in a guide frame, coupling means provided on the upper die support and on the saddle plate disposed on the lower die support for connection with said tool unit, wherein said tool unit as a whole is insertable between the upper and the lower die support in the longitudinal direction of said machine frame, from the direction of the open front end, wherein said saddle plate is rotatably disposed in the horizontal plane with respect to the lower die support, and wherein a hydraulic thrust drive is provided on the lower die support operating in the longitudinal direction of the machine frame to enable the tool unit to be pushed out of the saddle plate in the direction towards the front and pulled into the saddle plate in the opposite direction by means of the thrust drive.

3. A machine tool comprising a machine frame open at three sides and being in the approximate shape of the letter C, having upper and lower die supports disposed on said machine frame, a drive cradle disposed on the upper die support, a saddle plate disposed on the lower die support, and a tool unit, comprised of an upper die and a lower die in a guide frame, coupling means provided on the upper die support and on the saddle plate disposed on the lower die support for connection with said tool unit, wherein said tool unit as a whole is insertable between the upper and the lower die support in the longitudinal direction of said machine frame, from the direction of the open front end, wherein said saddle plate is rotatably disposed in the horizontal plane with respect to the lower die support, and wherein rotational movements of the saddle plate is limited by stops in both directions of rotation.

4. A machine tool comprising a machine frame open at three sides and being in the approximate shape of the letter C, having upper and lower die supports disposed on said machine frame, a drive cradle disposed on the upper die support, a saddle plate disposed on the lower die aupport, and a tool unit, comprised of an upper die and a lower die in a guide frame, coupling means provided on the upper die support and on the saddle plate disposed on the lower die support for connection with said tool unit, wherein said tool unit as a whole is insertable between the upper and the lower die support in the longitudinal direction of said machine frame, from the direction of the open front end, wherein said saddle plate is rotatably disposed in the horizontal plane with respect to the lower die support, and wherein a motor drive in the form of a hydraulic drive, is provided for the saddle plate.

5. A machine tool in accordance with claim 4, wherein the saddle plate has a toothed wheel rim extending around the outer circumference and the motor drive is a rotary drive having a pinion gear engageable with said toothed wheel rim.

6. A machine tool comprising a machine frame open at three sides and being in the approximate shape of the letter C, having upper and lower die supports disposed on said machine frame, a drive cradle disposed on the upper die support, a saddle plate disposed on the lower die support, and a tool unit, comprised of an upper die and a lower die in a guide frame, coupling means provided on the upper die support and on the saddle plate disposed on the lower die support for connection with said tool unit, wherein said tool unit as a whole is insertable between the upper and the lower die support in the longitudinal direction of said machine frame, from the direction of the open front end, wherein said saddle plate is rotatably disposed in the horizontal plane with respect to the lower die support, and wherein the coupling means is rotatably symmetrical on the upper die support, and the tool unit is axially coupled with the upper die support but freely rotatable with respect to said upper die support.

7. A machine tool in accordance with claim 2, wherein the thrust drive is disposed between the saddle plate and the machine frame and is connected with the tool unit in the center position of the saddle plate.

8. A machine tool in accordance with claim 2, wherein the thrust drive is disposed on the saddle plate.

* * * * *